(No Model.)
C. WILLMS.
ELECTRIC BATTERY.
No. 554,759. Patented Feb. 18, 1896.
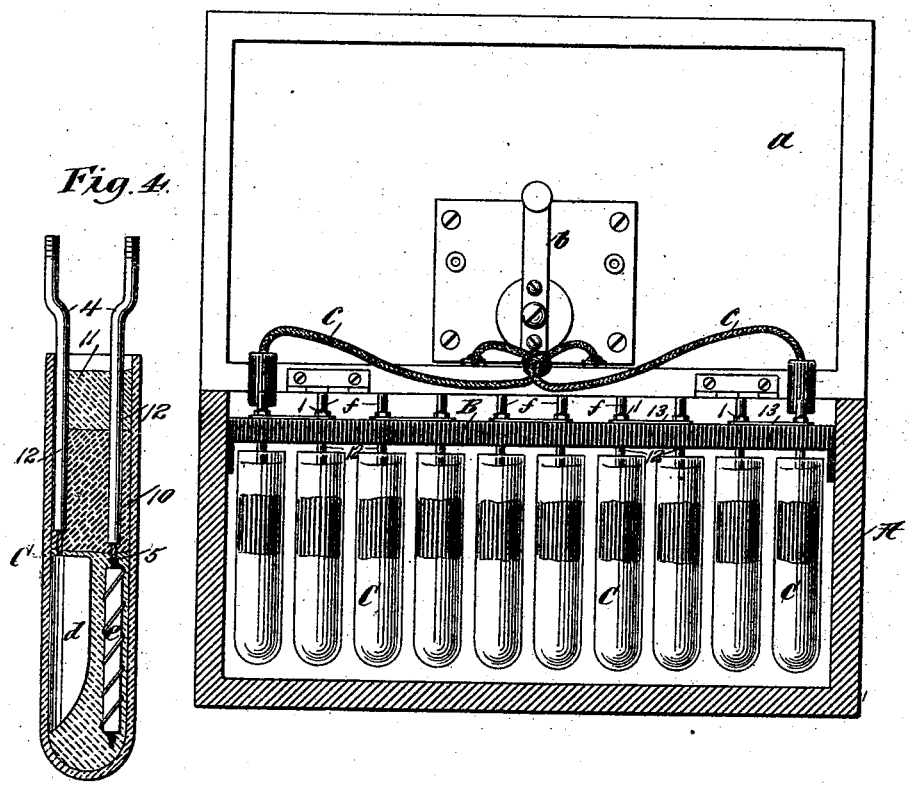
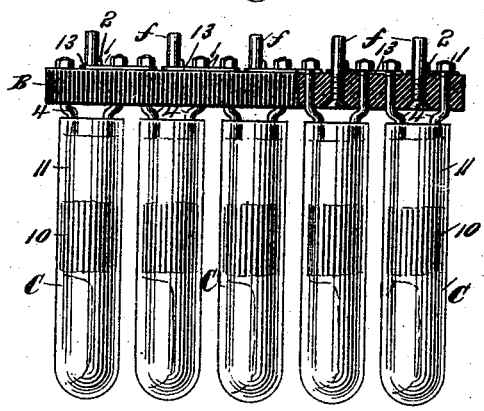
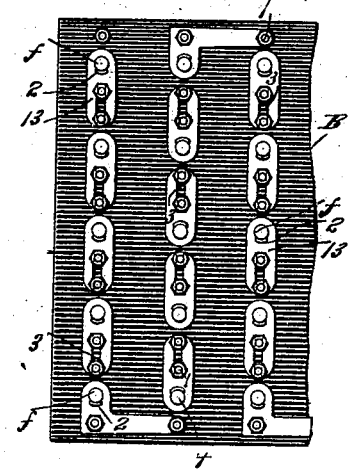
Witnesses:
Edward Thorpe.
W. H. Kennedy
Inventor:
Charles Willms
By Philipp Munson & Phelps,
Attys

UNITED STATES PATENT OFFICE.

CHARLES WILLMS, OF BALTIMORE, MARYLAND.

ELECTRIC BATTERY.

SPECIFICATION forming part of Letters Patent No. 554,759, dated February 18, 1896.

Application filed May 3, 1893. Serial No. 472,867. (No model.)

*To all whom it may concern:*

Be it known that I, CHARLES WILLMS, a citizen of the United States, residing at the city of Baltimore, State of Maryland, have invented certain new and useful Improvements in Electric Batteries, fully described and represented in the following specification and the accompanying drawings, forming a part of the same.

The object of the present invention is to provide an improved battery of that class known as "dry-cell" batteries, consisting of a considerable number of small dry cells, and especially to provide a construction by which the individual cells may more readily be placed in and removed from their support in the battery than in batteries previously in use.

As the life of the small dry cells used in such batteries is necessarily limited, and the battery needs renewal by substituting new cells for the old quite frequently, it is desirable that the cells when exhausted may readily be removed and new cells substituted therefor in such a manner as to secure the proper connections with certainty without the return of the battery to the factory or special skill on the part of the operative. I accomplish this object in accordance with the present invention by providing the cells with enlarged terminals, by which the individual cells are supported, and secure these terminals to the cell-support of the battery by a removable device of such a construction that the cells are held firmly in position and at the same time may readily be removed and new cells substituted therefor.

In connection with this invention I have devised certain improvements in dry cells and terminals therefor, and these improvements, together with certain specific features of construction in my improved battery, form in themselves parts of the present invention.

For a full understanding of my invention a detailed description will now be given of a battery embodying the same in the preferred form, reference being had to the accompanying drawings, forming a part of this specification, in which—

Figure 1 is a vertical sectional view of the complete battery and case with the cover of the case raised. Fig. 2 is an enlarged section of a part of the battery-support with cells in place. Fig. 3 is a plan view of a portion of the support with the cells in place. Fig. 4 is an enlarged section of one of the cells, showing the battery elements and terminals of the preferred form. Fig. 5 is a detail perspective of one of the connecting-plates of the preferred form.

Referring to the drawings, A is the battery-case, shown as having the usual hinged cover $a$, on which is supported the switch $b$ and conductors $c$, by which the current is taken from the battery according to the number of cells included in the circuit. Within the battery A is the cell-support B, this support B consisting in the form shown of a plate of non-conducting material supported within the cell-case A, so as to hold the cells C above the bottom of the case and to be readily removable from the case. The cells C are shown as the common glass chloride-of-silver dry cells, now well known, and fully described in many prior patents—*e. g.*, Nos. 450,840, 479,541, 437,469, 421,801, 414,627, 403,451, 374,863, and 347,862—the lower part of the cell containing the battery fluid and elements, and the cell being closed, first, by a body of plastic material 10 and outside this by a plug 11 of plaster-of-paris or similar material.

Referring now to the construction by which the cells are supported in the cell-support B, the two battery elements $d\ e$ are each provided with terminals 12, which are enlarged beyond what is required for the conduction of the current sufficiently to form a strong support for the cells and to permit of securing the terminals to the cell-support B by a suitable removable device and preferably by a screw-cap of proper form. As shown, these terminals 12 are screw-threaded at their outer ends and passed through holes in the cell-support B, in which they fit tightly, and are secured in place in the cell-support by nuts forming screw-caps 1, screwed onto the screw-threaded outer ends of the terminals, conduction between the terminals and the connectors $f$ of the battery being secured by means of conducting-plates 13, through which the terminals 12 and the connectors $f$ pass. While sufficient conduction may be secured by the contact of the connector $f$ with the edge of the hole in the plate 13 through which the connector passes, I preferably provide a construction by which a large conducting-surface is provided with a thin plate by forming on the plate 13 a stud 2, which presses against the connector $f$. For the purpose of securing proper contact between the stud and connector independently of wear in use or other conditions I preferably make the plate 13 adjustable transversely to the connector $f$ by providing it with a slot 3, through which the terminals 12 pass, so that this plate 13 may be shifted laterally to keep the stud 2 pressed against the connector $f$. It will be seen that by this construction a cell can readily be inserted and secured in the support and the proper connections formed by placing the plate 13 upon the connector $f$, passing the terminals 12 through the holes in the cell-support and securing them by the nuts 1, the two terminals of a cell making contact with adjacent plates 13, and thus completing the circuit from silver to copper, &c., as in the batteries now well known. While the terminals may be straight, with the small dry cells now preferably employed, to avoid danger of short-circuiting, I prefer to bend the terminals 13 outward, as shown at 4, so as to separate the outer ends of the terminals farther than would be possible with straight terminals.

With the cell shown, in which the plaster-of-paris or other plug 11 forms a rigid body in which the terminals 12 cannot be moved, it is necessary that the terminals should be exactly positioned during the filling of the cells and before the plug has become rigid. In order to secure this result in the most convenient manner, I preferably employ the construction shown, in which each of the terminals 12 is connected to the battery element by a flexible portion 5, this flexible portion preferably consisting of several strands of small wire, as shown, which increases the flexibility and at the same time provides for conduction, even if one or more of the strands should be broken in making the cell.

In the construction of the cell the elements $d\ e$ are placed in position in the battery liquid at the bottom of the cell, the plastic plug 10 or part thereof is introduced, and the terminals 12 can then be properly positioned by bending the flexible portions 5 so as to bring the outer ends of the terminals at the proper distance apart and in exact position to correspond with the holes in the cell-support B. When these parts are properly positioned, the cell is finished by completing the plastic plug 10 and inserting the plaster-of-paris or other rigid plug 11.

In order to secure the proper positioning of the terminals and hold them thus during the filling of the cell, it will be found convenient to use a small block having holes corresponding in position to those in the cell-support B, in which the terminals may be used so as to be held rigidly in position during the filling of the cell. When the cell is completed and the plaster-of-paris plug has set, this block may be removed and the cell is then ready for placing in the battery. It will be understood, however, that any other suitable means may be used for this purpose.

It is obvious that many modifications may be made in details of the construction shown or by a substitution of equivalents without departing from the invention as defined by the claims, and I am not to be limited to the specific form of the devices as illustrated, as these are shown only in their preferred form.

It will be found that this invention provides a very simple and convenient construction by which the cells are firmly held in proper position, and at the same time may readily be placed in and removed from the support, and the proper connections secured, without special apparatus or special skill on the part of the operative. It is possible, therefore, to supply dealers at distant points with a stock of cells, so that upon the exhaustion of any battery the exhausted cells may readily be replaced by new cells at short notice and without return of the battery to the factory.

By the term "enlarged cell-supporting terminal" used in the claims I mean and intend to cover a terminal enlarged beyond what is necessary for the purpose of carrying the cell-current for the purpose of affording a firm and convenient support for the cell.

What is claimed is—

1. The combination with the cell-support of an electric battery, of cells provided with enlarged supporting-terminals, and removable devices securing said terminals to the cell-support, substantially as described.

2. The combination with the cell-supporting plate of a battery, of cells having enlarged supporting-terminals passing through said plate, and removable devices on the ends of the terminals securing said terminals in the cell-support, substantially as described.

3. The combination with a cell-supporting plate of a battery, of cells having enlarged supporting-terminals passing through the support and provided with screw-threads, and screw-caps securing the ends of the terminals in the support, substantially as described.

4. The combination with cell-supporting plate B and connectors $f$ on said plate, of cells C having terminals 12 screw-threaded at their ends and passing through the support, connecting-plates 13 engaging the connectors $f$ and through which the terminals pass, and screw-caps 1 securing the terminals, substantially as described.

5. The combination with cell-supporting plate B and connectors $f$ on said plate, of cells C having terminals 12, screw-threaded at their ends and passing through the support, and connecting-plates 13 having contact-arms 2 engaging the connectors $f$ and slots 3 through which the terminals pass, and screw-caps 1 securing the terminals, substantially as described.

6. The combination with a cell-support, of a battery-cell having the enlarged cell-supporting terminals 12, substantially as described.

7. The combination with a cell-support, of a battery-cell having the enlarged cell-supporting terminals 12 bent outward at their outer ends, substantially as described.

In testimony whereof I have hereunto set my hand in the presence of two subscribing witnesses.

CH. WILLMS.

Witnesses:
W. N. WAMSLEY,
WM. H. JONES.